B. R. KILLIAN.
SHOCK ABSORBER.
APPLICATION FILED MAR. 25, 1919.
1,334,247.
Patented Mar. 16, 1920.
2 SHEETS—SHEET 2.
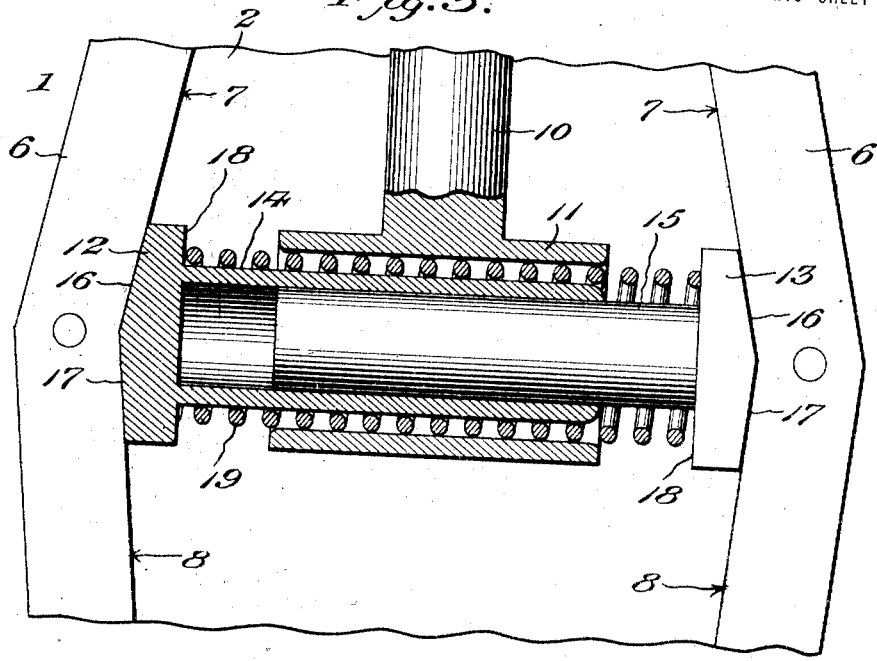
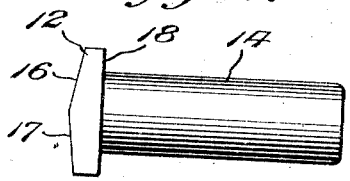
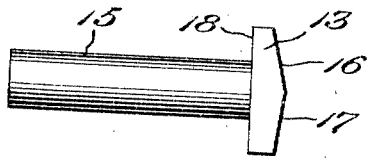
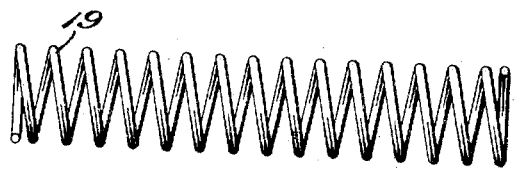
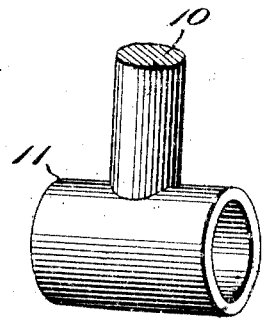
Inventor
B. R. Killian
By Victor J. Evans
Attorney

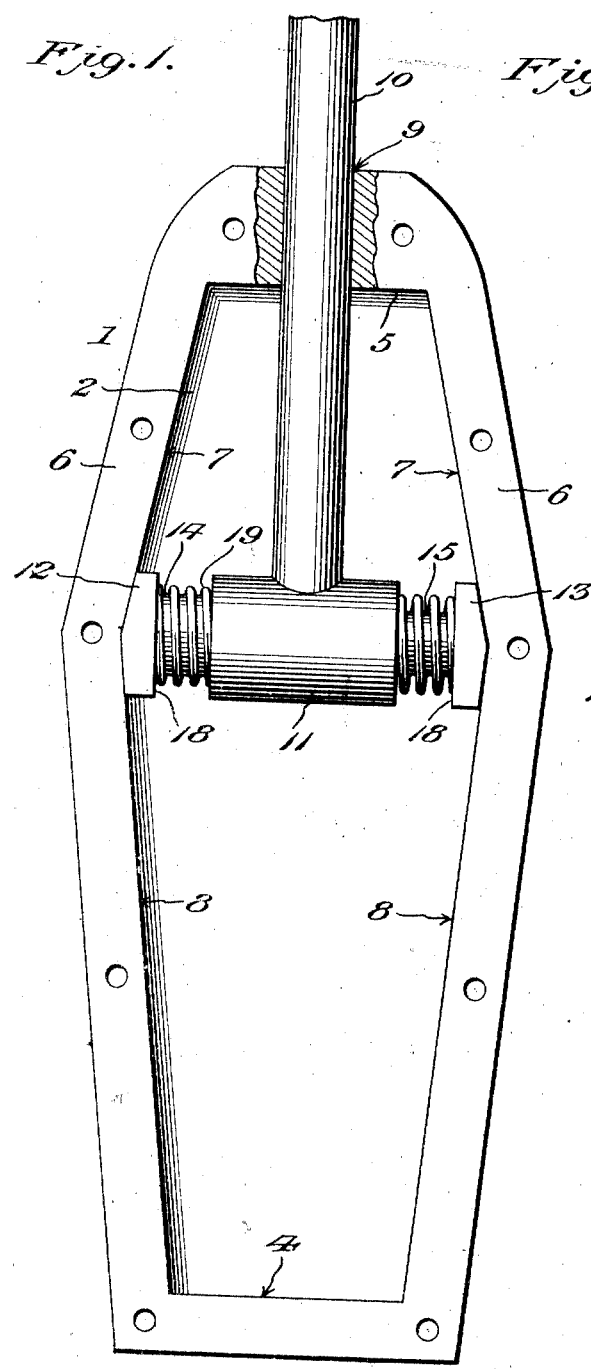
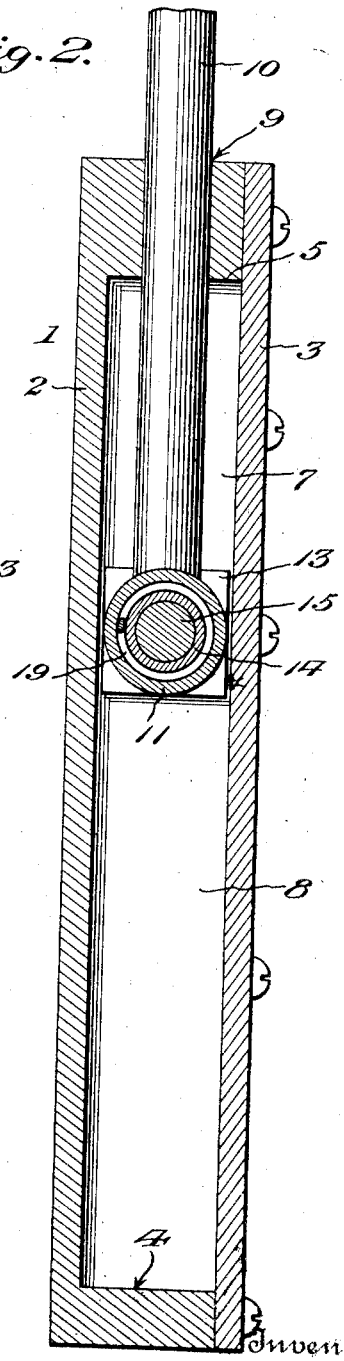

UNITED STATES PATENT OFFICE.

BAXTER R. KILLIAN, OF CENTRALIA, WASHINGTON.

SHOCK-ABSORBER.

1,334,247.  Specification of Letters Patent.  Patented Mar. 16, 1920.

Application filed March 25, 1919. Serial No. 284,996.

*To all whom it may concern:*

Be it known that I, BAXTER R. KILLIAN, a citizen of the United States, residing at Centralia, in the county of Lewis and State of Washington, have invented new and useful Improvements in Shock-Absorbers, of which the following is a specification.

This invention relates to shock absorbers and while especially designed for use in connection with motor vehicles, the shock absorber is adapted for use in various connections and for various purposes or wherever it is desired to absorb vibration between two relatively movable structures, the particular object in view being to prevent the objectionable rebound of the body of a vehicle after an undue compression of the body supporting springs of the vehicle.

With the above and other objects in view, the invention consists in the novel construction, combination and arrangement of parts herein fully described, illustrated and claimed.

In the accompanying drawings:—

Figure 1 is a view in elevation of the shock absorbing device showing the face plate of the main member of the device removed.

Fig. 2 is an enlarged vertical sectional view of the braking members, showing the manner of supporting and moving the latter in relation to the angular brake surfaces.

Fig. 3 is a vertical sectional view through a portion of the invention.

Fig. 4 is a detail view of one of the brake members.

Fig. 5 is a detail view of the other brake member.

Fig. 6 is a detail view of the yieldable means or spring.

Fig. 7 is a detail view of the carrier for the brake member.

The main member of the device is indicated at 1, the same comprising an integral back wall 2, a face plate 3 which is removably secured to the main member of the device for the purpose of giving access to the interior thereof, the main member also comprising a bottom wall 4, a top wall or cap 5, and side flanges or walls 6, each of which is shown as embodying two inclined surfaces 7 and 8, two sets of such surfaces being illustrated and arranged in opposed and spaced relation to each other as clearly shown in Fig. 1.

The top wall or cap 5 of the member 1 is provided with a normally vertical central opening 9 in which is slidably arranged the stem or shank 10 of a carrier 11 of tubular formation, the purpose of which will presently appear.

The improved shock absorber also comprises a pair of shoes or members 12 and 13 having a telescopic and slidable relation to each other, the member 12 being provided with a tubular shank 14, and the member 13 being provided with a shank 15 which is slidable in the tubular shank 14, the parts 14 and 15 being interfitting and telescopic as shown. Each of the members 12 and 13 has a working surface 16, 17, which surface is wedge shaped or consists of two surfaces arranged at an angle to each other corresponding with the angle between the surfaces 7 and 8 of the main member 1 of the device. The width of the head portion of the members 12 and 13 is just sufficient to enable them to work freely between the back and face plate of the member 1 so that the said members 12 and 13 are prevented from turning axially while permitted to slide freely in telescopic relation to each other. The shoes or members 12 and 13 are reduced to form bearing shoulders 18 and yieldable means in the form of a spring 19 is inserted between and bears against the shoulders 18 so as to normally force the members 12 and 13 away from each other and into sliding frictional engagement with the surfaces 7 and 8 above referred to. The portions 11 of the carrier 10 which is tubular is of sufficient internal diameter to receive both of the members 12 and 13 and the expansion spring 19, the member 11 serving to house and protect the spring 19 and actuate the members longitudinally of the main member 1 of the device. Any suitable means may be provided for attaching the member 1 to a portion of the vehicle such as the axle and for attaching the other member 10 to another portion of the vehicle such as the body, it being understood that the two main members of the device may be attached by any suitable means or in any suitable way to relatively movable structures between which the shocks or vibrations are to be absorbed. While the device is particularly adapted to check the rebound of the bodies of motor vehicles, it will of course be seen that the device is capable of other applications and uses which will readily suggest themselves to the manufacturer.

It will be seen from the foregoing description, taken in connection with the drawings, that as the compression spring 19 between the shoes expands, when relieved of its load, the sudden expansion of said spring is resisted by the inclined surfaces 7 and 8. The spring thus acts slowly and avoids the sudden and violent rebound which always occurs with an unrestrained spring. This excessive rebound of the spring is eliminated without impairing the load-carrying capacity or quality thereof.

What I claim is:—

1. A shock absorber comprising a member having two sets of inclined walls extending in opposite directions, a carrier, a pair of shoes for sliding engagement with the walls and having a telescoping connection with each other and a spring forcing the shoes into engagement with the walls and supporting the shoes from the carrier.

2. A shock absorber for relatively movable structures, comprising a member having opposing inclined surfaces, shoes arranged between said surfaces and adapted to engage therewith, expanding members for forcing said shoes apart, and an actuating carrier for said shoes movable in relation to the first named member, said inclined surfaces being at an angle to the path of movement of said carrier, and said shoes having interfitting telescopic portions.

In testimony whereof I affix my signature.

BAXTER R. KILLIAN.